(12) United States Patent
Takeuchi (10) Patent No.: US 7,614,803 B2
(45) Date of Patent: Nov. 10, 2009

(54) IMAGE PICKUP DEVICE

(75) Inventor: Yoshihito Takeuchi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 252 days.

(21) Appl. No.: 11/741,241

(22) Filed: Apr. 27, 2007

(65) Prior Publication Data

US 2008/0002966 A1 Jan. 3, 2008

(30) Foreign Application Priority Data

Jun. 30, 2006 (JP) ............................. 2006-182091

(51) Int. Cl.
*G03B 17/00* (2006.01)
*G03B 17/02* (2006.01)
*F16M 11/02* (2006.01)
(52) U.S. Cl. ............... 396/419; 396/535; 248/177.1
(58) Field of Classification Search ............. 396/419, 396/420, 428, 533, 535; 348/373, 374, 375, 348/376; 248/177.1, 187.1, 188.4
See application file for complete search history.

(56) References Cited

U.S. PATENT DOCUMENTS 5,666,582 A * 9/1997 Nakai et al. ................. 396/419

2007/0170187 A1 * 7/2007 Tharp et al. ................. 220/303

FOREIGN PATENT DOCUMENTS

| JP | 8-304902 A | 11/1996 |
|---|---|---|
| JP | 2002-6381 A | 1/2002 |
| JP | 2003-241278 A | 8/2003 |
| JP | 2003-255453 A | 9/2003 |

* cited by examiner

*Primary Examiner*—Christopher E Mahoney
*Assistant Examiner*—Minh Q Phan
(74) *Attorney, Agent, or Firm*—Crowell & Moring LLP (57) ABSTRACT

An image pickup device capable of suppressing breakage of a support leg mounting member is obtained. This image pickup device comprises a housing constituting the body of the image pickup device, a support leg mounting member, rotatably provided on the housing, having a second screw portion fitted with a first screw portion of a support leg supporting the body of the image pickup device and an engaging portion and a plate spring member having a protrusion engaging with the engaging portion of the support leg mounting member. The engaging portion of the support leg mounting member presses the protrusion of the plate spring member for disengaging the support leg mounting member and the protrusion of the plate spring member from each other if force exceeding first force is applied to the support leg mounting member in a first rotational direction when the first screw portion of the support leg is clamped to the second screw portion of the support leg mounting member in the first rotational direction.

14 Claims, 7 Drawing Sheets

IMAGE PICKUP DEVICE

BACKGROUND OF THE INVENTION

1. Field of the Invention

The present invention relates to an image pickup device, and more particularly, it relates to an image pickup device comprising a support leg mounting member for mounting a support leg on the image pickup device for supporting the image pickup device.

2. Description of the Background Art

An image pickup device comprising a support leg mounting member (tripod mounting member) for mounting a support leg such as a tripod on the image pickup device is known in general, as disclosed in Japanese Patent Laying-Open Nos. 8-304902 (1996), 2002-6381, 2003-241278 and 2003-255453, for example.

Each of the aforementioned four gazettes discloses an image pickup device constituted of a housing, on which a tripod mounting member having an internal thread portion is set. A tripod for supporting the image pickup device according to each of the aforementioned four gazettes is provided with an external thread portion fitted with the internal thread portion of the tripod mounting member of the image pickup device.

In each of conventional image pickup devices disclosed in the aforementioned four gazettes, however, an internal thread portion of a tripod mounting member (support leg mounting member) of the image pickup device is disadvantageously broken when an external thread portion of a tripod is fitted into the internal thread portion of the image pickup device.

SUMMARY OF THE INVENTION

The present invention has been proposed in order to solve the aforementioned problem, and an object of the present invention is to provide an image pickup device capable of suppressing breakage of a support leg mounting member.

An image pickup device according to a first aspect of the present invention comprises a housing constituting the body of the image pickup device, a support leg mounting member, rotatably provided on the housing, having a second screw portion fitted with a first screw portion of a support leg supporting the body of the image pickup device and an engaging portion and a plate spring member having a protrusion engaging with the engaging portion of the support leg mounting member, while the engaging portion of the support leg mounting member presses the protrusion of the plate spring member for disengaging the support leg mounting member and the protrusion of the plate spring member from each other if force exceeding first force is applied to the support leg mounting member in a first rotational direction when the first screw portion of the support leg is clamped to the second screw portion of the support leg mounting member in the first rotational direction.

In the image pickup device according to the first aspect of the present invention, as hereinabove described, the support leg mounting member having the second screw portion fitted with the first screw portion of the support leg supporting the body of the image pickup device and the engaging portion is rotatably provided on the housing along with the plate spring member having the protrusion so that the engaging portion of the support leg mounting member presses the protrusion of the plate spring member for disengaging the protrusion of the plate spring member from the engaging portion of the support leg mounting member if force exceeding the first force is applied to the support leg mounting member in the first rotational direction when the first screw portion of the support leg is fitted into the second screw portion of the support leg mounting member, whereby the protrusion of the plate spring member and the engaging portion of the support leg mounting member are disengaged from each other and the support leg mounting member (second screw portion) is rotated in the first rotational direction along with the support leg (first screw portion) when the first screw portion of the support leg is clamped to the second screw portion of the support leg mounting member with force exceeding the first force. Thus, the image pickup device can suppress breakage of the support leg mounting member (second screw portion) also when the support leg (first screw portion) is clamped with excessive force (force exceeding the first force) to be fitted with the support leg mounting member (second screw portion). When the support leg (first screw portion) is clamped to the support leg mounting member (second screw portion) of the image pickup device with force less than the first force, the protrusion of the plate spring member and the engaging portion of the support leg mounting member are kept in engagement with each other, whereby the support leg mounting member (second screw portion) is not rotated in the first rotational direction along with the support leg (first screw portion). Thus, the first screw portion of the support leg can be clamped to the second screw portion of the support leg mounting member with force less than the first force.

The aforementioned image pickup device according to the first aspect preferably further comprises a holding member, mounted on the housing, having a hole rotatably receiving the support leg mounting member for rotatably holding the support leg mounting member received in the hole. According to this structure, the image pickup device can easily rotatably support the support leg mounting member with the holding member.

In this case, the holding member preferably includes a columnar portion provided across the hole of the holding member, the support leg mounting member preferably includes a step provided along the outer periphery of the lower surface of the support leg mounting member, and the upper surface and the step of the support leg mounting member preferably come into contact with the columnar portion and the bottom surface of the housing respectively so that the support leg mounting member is rotatably supported on the image pickup device. According to this structure, the upper surface of the support leg mounting member comes into contact with the columnar portion of the holding member, whereby the support leg mounting member can be prevented from falling out of the hole of the holding member toward the inner side of the housing. Further, the step of the support leg mounting member comes into contact with the bottom surface of the housing, whereby the support leg mounting member can be prevented from falling out of the hole of the housing toward the outer side of the housing. Consequently, the support leg mounting member can be rotatably supported on the image pickup device without falling out of the hole of the holding member.

In the aforementioned image pickup device according to the first aspect, the protrusion of the plate spring member preferably includes a first inclined surface and a second inclined surface inclined by a prescribed angle with respect to the first inclined surface while the engaging portion of the support leg mounting member preferably includes a first engaging surface engaging with the first inclined surface of the plate spring member and a second engaging surface engaging with the second inclined surface of the plate spring member, and the first and second engaging surfaces of the engaging portion and the first and second inclined surfaces of the plate spring member are preferably so formed that the first engaging surface of the support leg mounting member presses the first inclined surface of the plate spring member for disengaging the first inclined surface of the plate spring member from the first engaging surface of the support leg mounting member when force exceeding the first force is applied to the support leg mounting member in the first rotational direction while the second engaging surface and the second inclined surface are not disengaged from each other even if the second engaging surface of the support leg mounting member presses the second inclined surface of the plate spring member when force exceeding the first force is applied to the support leg mounting member in a second rotational direction opposite to the first rotational direction. According to this structure, the second inclined surface of the plate spring member and the second engaging surface of the support leg mounting member are kept in engagement with each other even if force (exceeding the first force) exceeding clamping force (less than the first force) in the first rotational direction is applied in the second rotational direction for dismounting the support leg (first screw portion) from the support leg mounting member (second screw portion) of the image pickup device by rotating the support leg (first screw portion) in the second rotational direction opposite to the first rotational direction, whereby the support leg mounting member (second screw portion) is not rotated in the second rotational direction along with the support leg (first screw portion). Thus, the support leg (first screw portion) can be easily dismounted from the support leg mounting member (second screw portion) of the image pickup device.

In this case, the first and second engaging surfaces of the engaging portion are preferably so provided on the outer periphery of the rotatable support leg mounting member as to form gears of a ratchet mechanism for limiting the rotational direction of the support leg mounting member to the first rotational direction, and the first and second inclined surfaces of the plate spring member are preferably so provided as to form pawls of the ratchet mechanism. According to this structure, the engaging portion of the support leg mounting member and the plate spring member constituting the ratchet mechanism can easily limit the rotational direction of the support leg mounting member to the first rotational direction, whereby the support leg (first screw portion) can be easily dismounted from the support leg mounting member (second screw portion) of the image pickup device.

In this case, the first and second inclined surfaces of the plate spring member are preferably rendered surface-contactable with the first and second engaging surfaces of the engaging portion respectively. According to this structure, the engaging portion of the support leg mounting member (second screw portion) can be inhibited from backlash when engaging with the plate spring member.

In this case, at least the first inclined surface of the plate spring member is preferably rendered elastically deformable toward the radial outer side of the engaging portion of the support leg mounting member. According to this structure, the protrusion of the plate spring member restores the shape thereof toward the center of the engaging portion of the support leg mounting member (rotation center of the support leg mounting member) after the same is outwardly elastically deformed, whereby a subsequent engaging portion of the support leg mounting member and the protrusion of the plate spring member can easily engage with each other.

In the aforementioned image pickup device according to the first aspect, the plate spring member is preferably fixed to the support leg mounting member on both sides of the first and second inclined surfaces. According to this structure, the plate spring member can be inhibited from misregistration also when the first and second inclined surfaces of the plate spring member are repetitively elastically deformed.

In the aforementioned image pickup device according to the first aspect, a plurality of engaging portions are preferably formed on the support leg mounting member along the rotational direction of the support leg mounting member. According to this structure, each engaging portion of the support leg mounting member can engage with the protrusion of the plate spring member on a rotated position also when the support leg mounting member is rotated in the first rotational direction.

The aforementioned image pickup device according to the first aspect preferably further comprises a presser bar spring member pressing the upper surface of the engaging portion of the support leg mounting member. According to this structure, the presser bar spring member so presses the upper surface of the support leg mounting member that the image pickup device can prevent the support leg mounting member from falling out of the hole of the holding member toward the inner side of the housing.

An image pickup device according to a second aspect of the present invention comprises a housing constituting the body of the image pickup device, a support leg mounting member, rotatably provided on the housing, having a second screw portion fitted with a first screw portion of a support leg supporting the body of the image pickup device and an engaging portion, a holding member, mounted on the housing, having a hole rotatably receiving the support leg mounting member for rotatably holding the support leg mounting member received in the hole and a plate spring member, mounted on the holding member, having a protrusion including a first inclined surface and a second inclined surface inclined by a prescribed angle with respect to the first inclined surface, a plurality of engaging portions each including a first engaging surface engaging with the first inclined surface of the plate spring member and a second engaging surface engaging with the second inclined surface of the plate spring member are formed on the support leg mounting member along the rotational direction of the support leg mounting member, and the first and second engaging surfaces of each engaging portion and the first and second inclined surfaces of the plate spring member are so formed that the first engaging surface of the support leg mounting member presses the first inclined surface of the plate spring member to be disengaged from the first inclined surface if force exceeding the first force is applied to the support leg mounting member in a first rotational direction while the second engaging surface and the second inclined surface are not disengaged from each other even if the second engaging surface of the support leg mounting member presses the second inclined surface of the plate spring member if force exceeding the first force is applied to the support leg mounting member in a second rotational direction opposite to the first rotational direction when the first screw portion of the support leg is clamped to the second screw portion of the support leg mounting member in the first rotational direction.

In the image pickup device according to the second aspect of the present invention, as hereinabove described, the support leg mounting member having the second screw portion fitted with the first screw portion of the support leg supporting the body of the image pickup device and the engaging portions is rotatably provided on the housing along with the plate spring member having the protrusion so that each engaging portion of the support leg mounting member presses the protrusion of the plate spring member for disengaging the protrusion of the plate spring member from the engaging portion of the support leg mounting member if force exceeding the first force is applied to the support leg mounting member in the first rotational direction when the first screw portion of the support leg is fitted into the second screw portion of the support leg mounting member, whereby the protrusion of the plate spring member and the engaging portion of the support leg mounting member are disengaged from each other and the support leg mounting member (second screw portion) is rotated in the first rotational direction along with the support leg (first screw portion) when the first screw portion of the support leg is clamped to the second screw portion of the support leg mounting member with force exceeding the first force. Thus, the image pickup device can suppress breakage of the support leg mounting member (second screw portion) also when the support leg (first screw portion) is clamped with excessive force (force exceeding the first force) to be fitted with the support leg mounting member (second screw portion). When the support leg (first screw portion) is clamped to the support leg mounting member (second screw portion) of the image pickup device with force less than the first force, the protrusion of the plate spring member and the engaging portion of the support leg mounting member are kept in engagement with each other, whereby the support leg mounting member (second screw portion) is not rotated in the first rotational direction along with the support leg (first screw portion). Thus, the first screw portion of the support leg can be clamped to the second screw portion of the support leg mounting member with force less than the first force. Further, the image pickup device, comprising the holding member, mounted on the housing, having the hole rotatably receiving the support leg mounting member for rotatably holding the support leg mounting member received in the hole can easily rotatably hold the support leg mounting member with the holding member.

In the image pickup device according to the second aspect, further, the protrusion of the plate spring member includes the first inclined surface and the second inclined surface inclined by the prescribed angle with respect to the first inclined surface while each engaging portion of the support leg mounting member includes the first engaging surface engaging with the first inclined surface of the plate spring member and the second engaging surface engaging with the second inclined surface of the plate spring member and the first and second engaging surfaces of the engaging portion and the first and second inclined surfaces of the plate spring member are so formed that the second engaging surface and the second inclined surface are not disengaged from each other even if the second engaging surface of the support leg mounting member presses the second inclined surface of the plate spring member when force exceeding the first force is applied to the support leg mounting member in the second rotational direction opposite to the first rotational direction, whereby the second inclined surface of the plate spring member and the second engaging surface of the support leg mounting member are kept in engagement with each other even if force (exceeding the first force) exceeding clamping force (less than the first force) in the first rotational direction is applied in the second rotational direction for dismounting the support leg (first screw portion) from the support leg mounting member (second screw portion) of the image pickup device by rotating the support leg (first screw portion) in the second rotational direction opposite to the first rotational direction, so that the support leg mounting member (second screw portion) is not rotated in the second rotational direction along with the support leg (first screw portion). Thus, the support leg (first screw portion) can be easily dismounted from the support leg mounting member (second screw portion) of the image pickup device. Further, the plurality of engaging portions are formed on the support leg mounting member along the rotational direction of the support leg mounting member, whereby each engaging portion of the support leg mounting member can engage with the protrusion of the plate spring member on a rotated position also when the support leg mounting member is rotated in the first rotational direction.

In the aforementioned image pickup device according to the second aspect, the holding member preferably includes a columnar portion provided across the hole of the holding member, the support leg mounting member preferably includes a step provided along the outer periphery of the lower surface of the support leg mounting member, and the upper surface and the step of the support leg mounting member preferably come into contact with the columnar portion and the bottom surface of the housing respectively so that the support leg mounting member is rotatably supported on the image pickup device. According to this structure, the upper surface of the support leg mounting member comes into contact with the columnar portion of the holding member, whereby the support leg mounting member can be prevented from falling out of the hole of the holding member toward the inner side of the housing, while the step of the support leg mounting member comes into contact with the bottom surface of the housing, whereby the support leg mounting member can be prevented from falling out of the hole of the holding member toward the outer side of the housing. Consequently, the support leg mounting member can be rotatably supported on the image pickup device without falling out of the hole of the holding member.

In the aforementioned image pickup device according to the second aspect, the first and second engaging surfaces of the engaging portions are preferably so provided on the outer periphery of the rotatable support leg mounting member as to form gears of a ratchet mechanism for limiting the rotational direction of the support leg mounting member to the first rotational direction, and the first and second inclined surfaces of the plate spring member are preferably so provided as to form pawls of the ratchet mechanism. According to this structure, the engaging portions of the support leg mounting member and the plate spring member constituting the ratchet mechanism can easily limit the rotational direction of the support leg mounting member to the first rotational direction, whereby the support leg (first screw portion) can be easily dismounted from the support leg mounting member (second screw portion) of the image pickup device.

In this case, the first and second inclined surfaces of the plate spring member are preferably rendered surface-contactable with the first and second engaging surfaces of each engaging portion respectively. According to this structure, each engaging portion of the support leg mounting member (second screw portion) can be inhibited from backlash when engaging with the plate spring member.

In this case, at least the first inclined surface of the plate spring member is preferably rendered elastically deformable toward the radial outer side of each engaging portion of the support leg mounting member. According to this structure, the protrusion of the plate spring member restores the shape thereof toward the center of each engaging portion of the support leg mounting member (rotation center of the support leg mounting member) after the same is outwardly elastically deformed, whereby a subsequent engaging portion of the support leg mounting member and the protrusion of the plate spring member can easily engage with each other.

In the aforementioned image pickup device according to the second aspect, the plate spring member is preferably fixed to the support leg mounting member on both sides of the first and second inclined surfaces. According to this structure, the plate spring member can be inhibited from misregistration also when the first and second inclined surfaces of the plate spring member are repetitively elastically deformed.

The aforementioned image pickup device according to the second aspect preferably further comprises a presser bar spring member pressing the upper surface of each engaging portion of the support leg mounting member. According to this structure, the presser bar spring member so presses the upper surface of the support leg mounting member that the image pickup device can prevent the support leg mounting member from falling out of the hole of the holding member toward the inner side of the housing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a video camera 1 according to this embodiment is described with reference to FIGS. 1 to 11.

Figure 1:
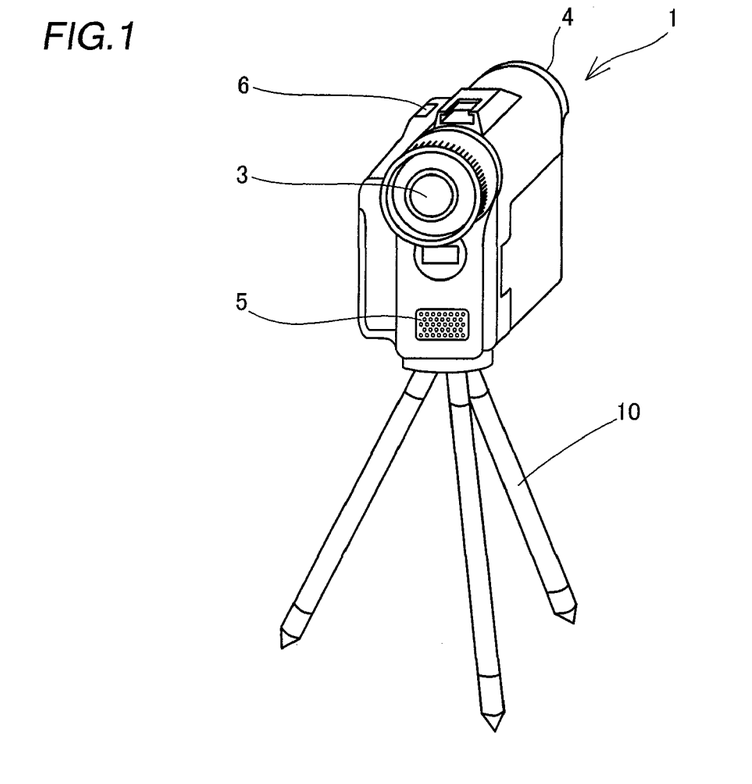
FIG. 1 is a perspective view showing a video camera according to an embodiment of the present invention in a state mounted with a tripod.

As shown in FIG. 1, the video camera 1 according to this embodiment is so formed that a tripod 10 is mountable thereon. The video camera 1 is constituted of a housing 2 mounted with a lens 3, a finder 4, a built-in microphone 5 and an image pickup button 6. The video camera 1 is an example of the "image pickup device" in the present invention, and the tripod 10 is an example of the "support leg" in the present invention.

Figure 2:
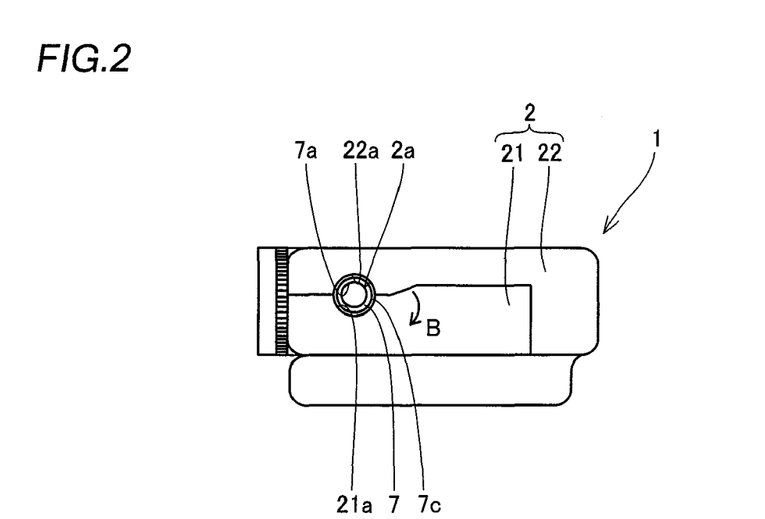
FIG. 2 is a bottom plan view of the video camera according to the embodiment shown in FIG. 1.

The housing 2 is constituted of a first housing 21 and a second housing 22. The first and second housings 21 and 22 are formed on the bottom surfaces thereof with notches 21a and 22a forming a circular hole 2a when the first and second housings 21 and 22 are combined with each other, as shown in FIG. 2. The lens 3 is stored in the housing 2 to outwardly protrude from this housing 2, as shown in FIG. 1. The finder 4 is so formed that a user can decide an image pickup range while observing an object through the finder 4. The built-in microphone 5 has a function of collecting sound in an image pickup operation (recording). The user presses the image pickup button 6, in order to pick up images.

According to this embodiment, a tripod mounting member 7 of resin having an internal thread 7a is provided on a portion corresponding to the hole 2a of the housing 2, as shown in FIG. 2. This tripod mounting member 7 is provided for mounting the tripod 10 shown in FIG. 1 on the video camera 1. The tripod mounting member 7 is an example of the "support leg mounting member" in the present invention, and the internal thread 7a is an example of the "second screw" in the present invention.

According to this embodiment, a holding member 8 of resin having a hole 8a is mounted on a portion corresponding to the hole 2a of the housing 2 as shown in FIGS. 3, 4, 7 and 8. As shown in FIGS. 3 to 7, the holding member 8 receives the tripod mounting member 7 in the hole 8a, thereby rotatably holding the tripod mounting member 7. A columnar portion 8b is integrally formed on a portion of the holding member 8 provided inside the housing 2 across the hole 8a. This columnar portion 8b inhibits the tripod mounting member 7 received in the hole 8a of the holding member 8 from falling out of the hole 8a toward the inner side of the housing 2 (along arrow A in FIG. 6). A mounting portion 8c for screwing the holding member 8 to the housing 2 is provided on a portion close to an end of the holding member 8 closer to the bottom surface of the housing 2.

Figure 6:
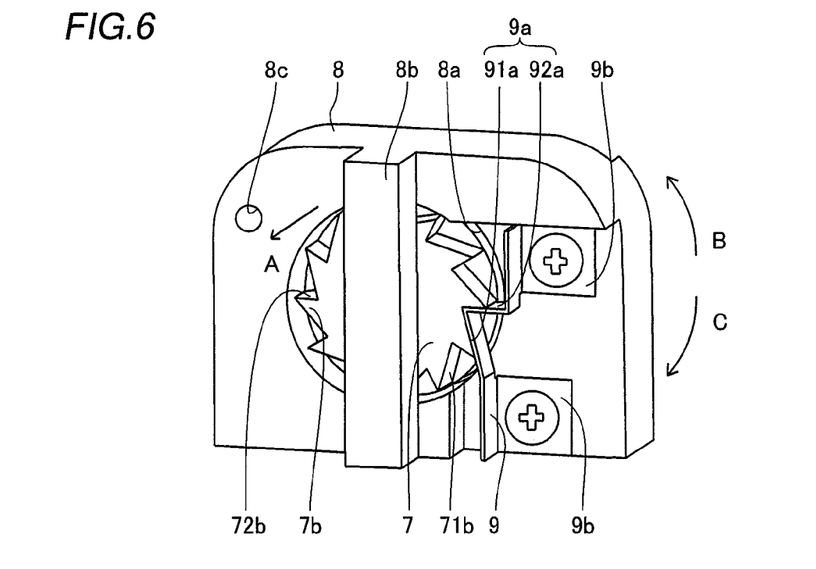
Figure 7:
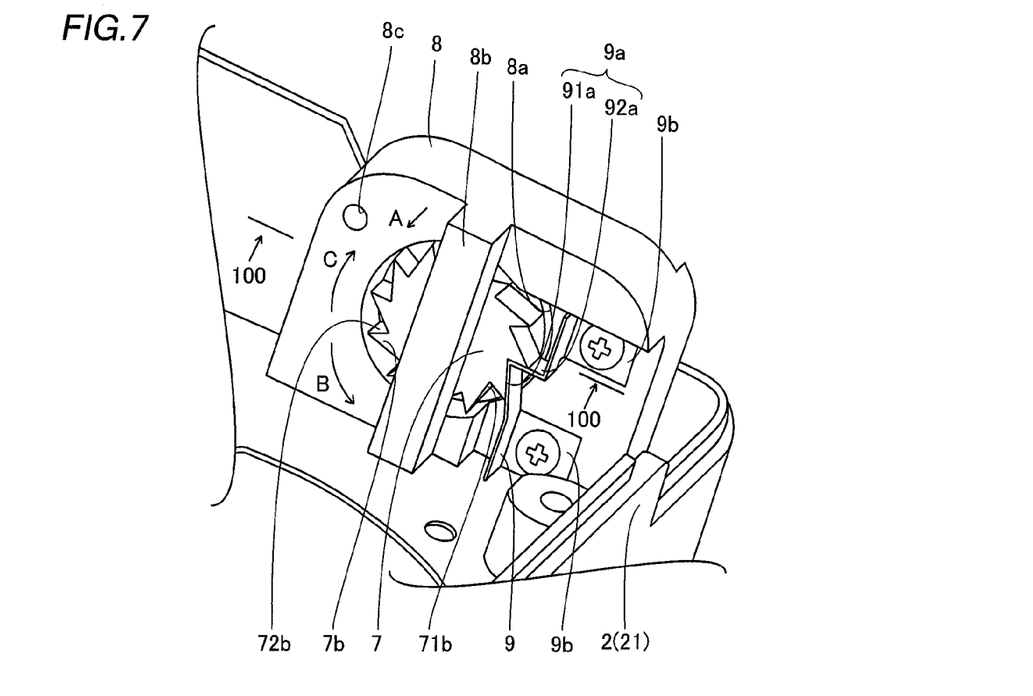
FIG. 7 is another enlarged view of the portion around the tripod mounting member held by the first housing of the video camera according to the embodiment of the present invention in the state mounted with the holding member.

According to this embodiment, a plate spring member 9 is mounted on a portion of the holding member 8 provided inside the housing 2, as shown in FIGS. 6 and 7. This plate spring member 9 has a protrusion 9a, which is constituted of a first inclined surface 91a and a second inclined surface 92a inclined by a prescribed angle with respect to the first inclined surface 91a. The plate spring member 9 is so arranged that the protrusion 9a protrudes toward the hole 8a of the holding member 8. The first and second inclined surfaces 91a and 92a of the plate spring member 9 are rendered elastically deformable toward the radial outer side of each engaging portion 7b of the tripod mounting member 7 described later. The plate spring member 9 is provided with a pair of mounting portions 9b for screwing both of portions of the plate spring member 9 closer to the first and second inclined surfaces 91a and 92a to the holding member 8.

Figure 9:
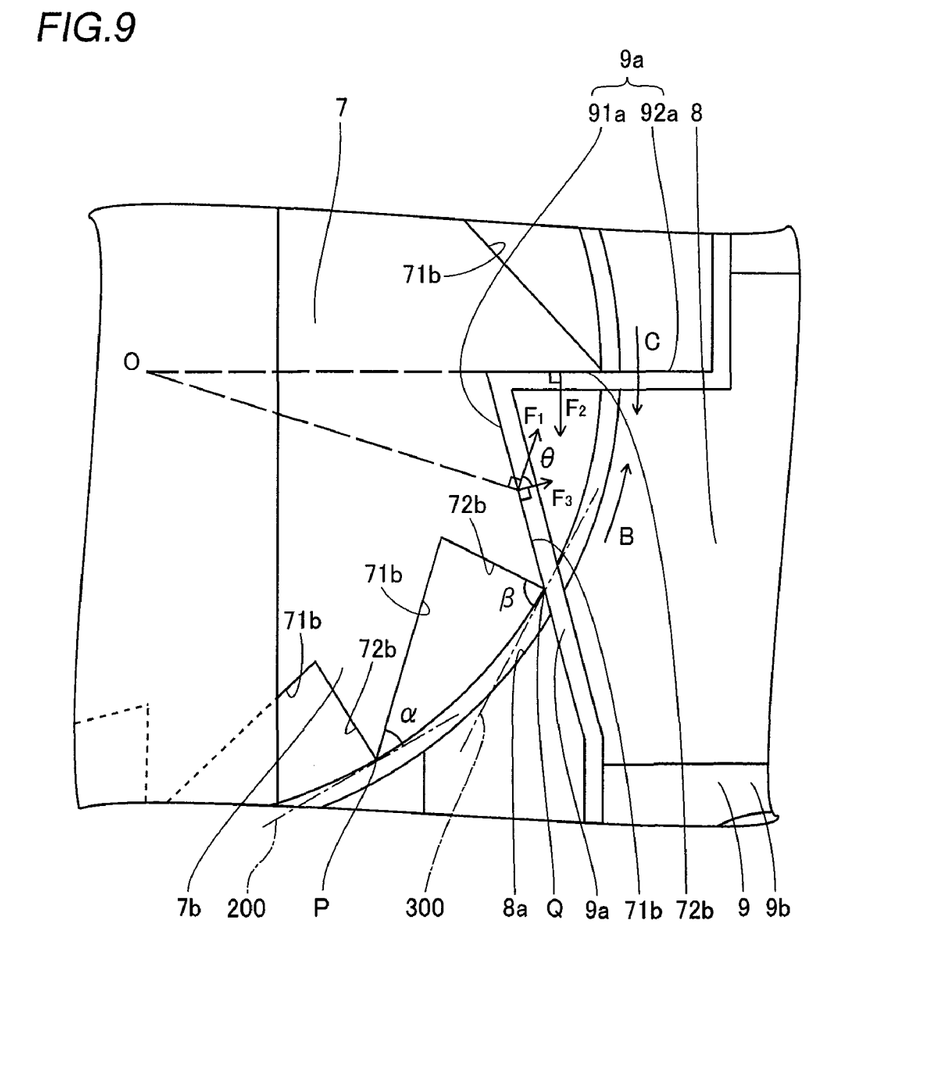
FIG. 9 is an enlarged plan view showing the tripod mounting member of the video camera according to the embodiment of the present invention in a state engaging with a plate spring member.

According to this embodiment, the engaging portions 7b having first and second engaging surfaces 71b and 72b engaging with the first and second inclined surfaces 91a and 92a of the plate spring member 9 respectively are formed on the outer periphery of the upper surface of the tripod mounting member 7 (inside the housing 2), as shown in FIGS. 6, 7 and 9. 12 such engaging portions 7b in the form of inclined gears are provided on the outer periphery of the tripod mounting member 7 at a regular interval along the rotational directions of the tripod mounting member 7 (along arrows B and C in FIG. 7). The first and second engaging surfaces 71b and 72b of the engaging portions 7b constitute gears of a ratchet mechanism for limiting the rotational direction of the tripod mounting member 7 to that along arrow B, while the protrusion 9a of the plate spring member 9 consisting of the first and second inclined surfaces 91a and 92a is so formed as to constitute a pawl of this ratchet mechanism. As shown in FIG. 9, the first and second engaging surfaces 71b and 72b are so formed that an angle β formed by each second engaging portion 72b and a tangential line 300 at the intersection point Q between a circumscribed circle (circle constituting the outer side surface of the tripod mounting member 7) circumscribed about the corresponding engaging portion 7b and the second engaging surface 72b is larger than an angle α formed by each first engaging surface 71b and a tangential line 200 at the intersection point P between the circumscribed circle (circle constituting the outer side surface of the tripod mounting member 7) circumscribed about the corresponding engaging portion 7b and the first engaging surface 71b. The first and second inclined surfaces 91a and 92a of the plate spring member 9 are rendered surface-contactable with the first and second engaging surfaces 71b and 72b of each engaging portion 7b respectively.

According to this embodiment, each first engaging surface 71b of the tripod mounting member 7 is so arranged as to press the first inclined surface 91a of the plate spring member 9 when force is applied to the tripod mounting member 7 along arrow B while each second engaging surface 72b of the tripod mounting member 7 is so arranged as to press the second inclined surface 92a of the plate spring member 9 when force is oppositely applied to the tripod mounting member 7 along arrow C, as shown in FIG. 9. When pressed by the first engaging surface 71b of each engaging portion 7b with tangential force $F_1$ of a circle about the rotation center O of the tripod mounting member 7, the first inclined surface 91a of the projection 9a receives force $F_3$ ($=F_1 \cos θ$) in the vertical direction thereof. This force $F_3$, outwardly inclined by an angle θ with respect to the tangential force $F_1$, renders the first inclined surface 91a of the protrusion 9a easily elastically deformable outward for disengaging the same. When pressed by the second engaging surface 72b of each engaging portion 7b with another tangential force $F_2$ of the circle about the rotation center O of the tripod mounting member 7, however, the second inclined surface 92a of the projection 9a receives the force $F_2$ in the vertical (tangential) direction thereof. Therefore, only the tangential force $F_2$ acts on the second inclined surface 92a of the protrusion 9a, with no force outwardly inclined with respect to the tangential force $F_2$. Thus, the second inclined surface 92a of the protrusion 9a is hardly outwardly elastically deformed and disengaged.

In other words, the protrusion 9a is formed to be hardly outwardly elastically deformed and disengaged from the tripod mounting member 7 when the force $F_2$ is applied to the second inclined surface 92a and to be easily outwardly elastically deformed and disengaged from the tripod mounting member 7 when the force $F_1$ is applied to the first inclined surface 91a. Therefore, the protrusion 9a of the plate spring member 9 is elastically deformed along the force $F_3$ for disengaging the corresponding first engaging surface 71b and the first inclined surface 91a from each other when force applied to the tripod mounting member 7 along arrow B is larger than first force, and not elastically deformed but keeps the engagement between the corresponding first engaging surface 71b and the first inclined surface 91a when force applied to the tripod mounting member 7 along arrow C is less than the first force. Further, the protrusion 9a of the plate spring member 9 is not elastically deformed but keeps the engagement between the corresponding second engaging surface 72b and the second inclined surface 92a also when the force applied to the tripod mounting member 7 along arrow C is larger than the first force.

Figure 3:
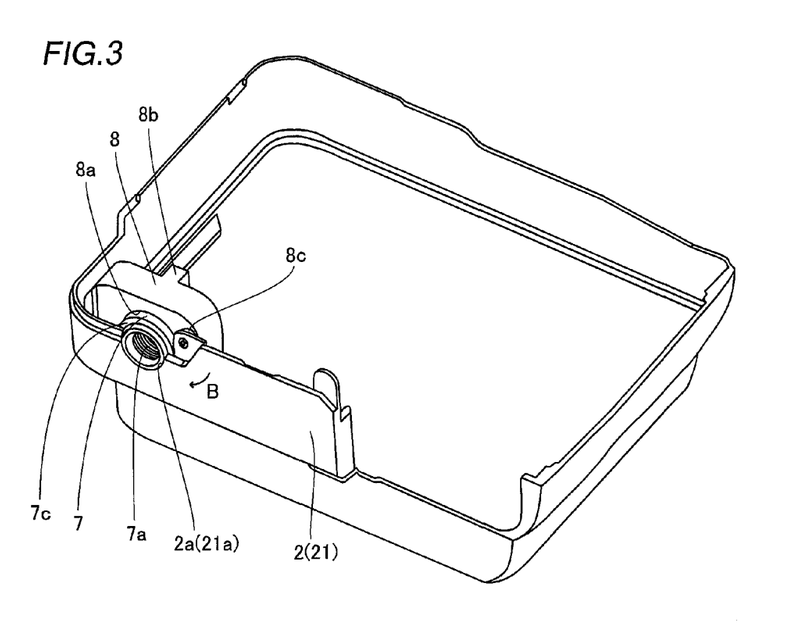
FIG. 3 is a perspective view of a first housing of the video camera according to the embodiment of the present invention in a state mounted with a holding member while holding a tripod mounting member.
Figure 4:
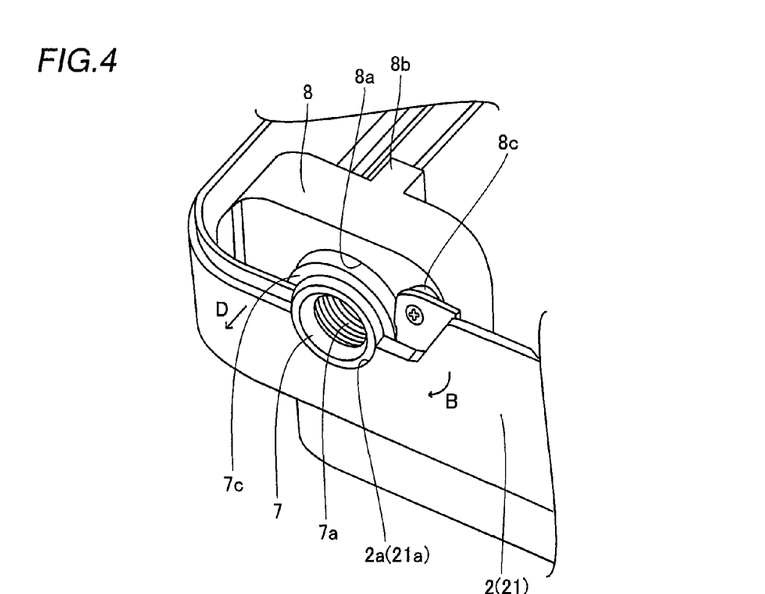
FIG. 4 is an enlarged view of a portion around the tripod mounting member held by the first housing of the video camera according to the embodiment of the present invention in the state mounted with the holding member.
Figure 5:
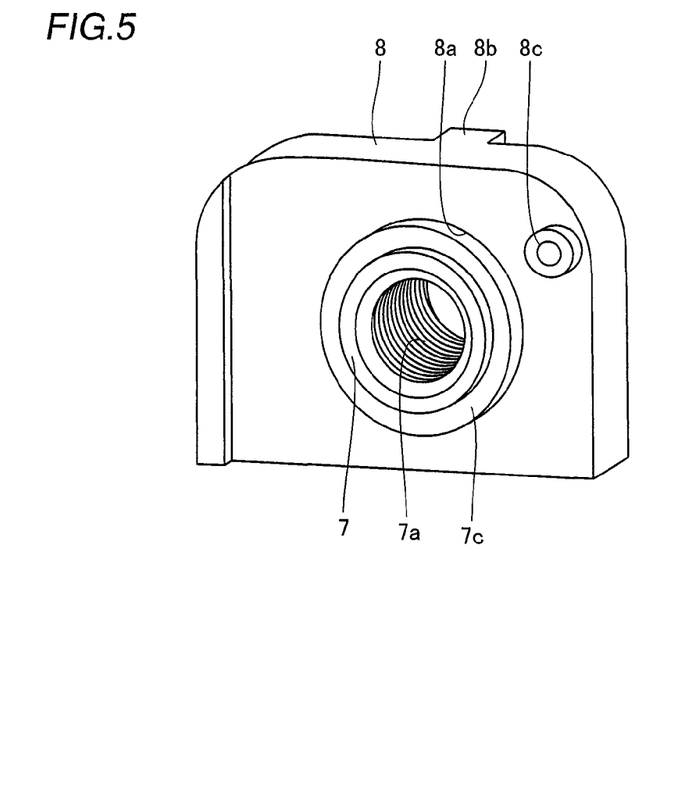
FIGS. 5 and 6 are perspective views of the holding member of the video camera according to the embodiment of the present invention, on which the tripod mounting member is arranged.
Figure 8:
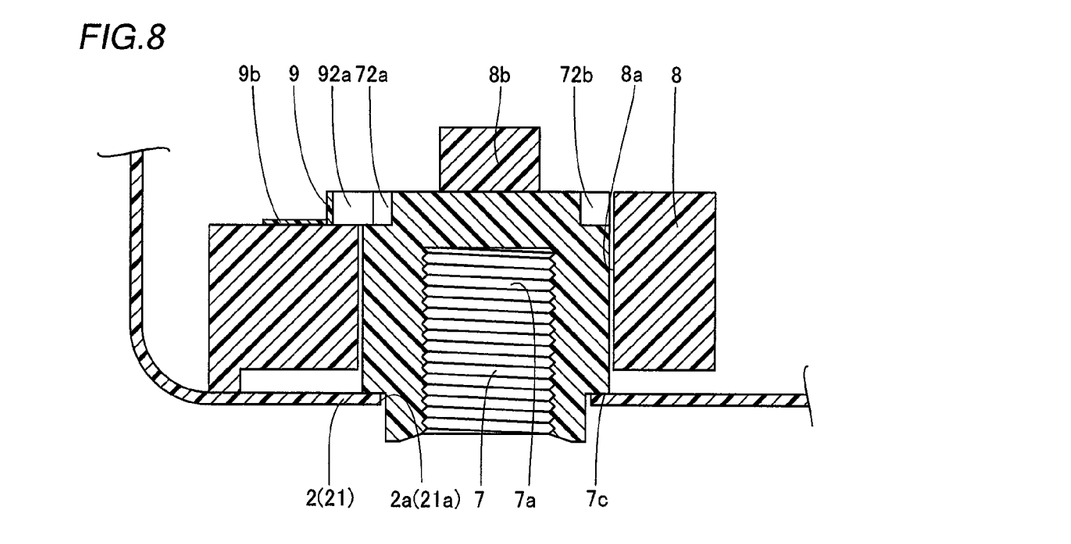
FIG. 8 is a sectional taken along the line 100-100 in FIG. 7.

According to this embodiment, a step 7c is provided on the lower surface of the tripod mounting member 7 along the outer periphery, as shown in FIGS. 3, 4 and 8. This step 7c of the tripod mounting member 7 is supported on the inner side of the housing 2 when the tripod mounting member 7 is received in the hole 8a of the holding member 8. Thus, the tripod mounting member 7 received in the hole 8a of the holding member 8 is inhibited from falling out of the hole 8a toward the outer side of the housing 2 (along arrow D in FIG. 4), and rotatably supported by the housing 2.

Figure 10:
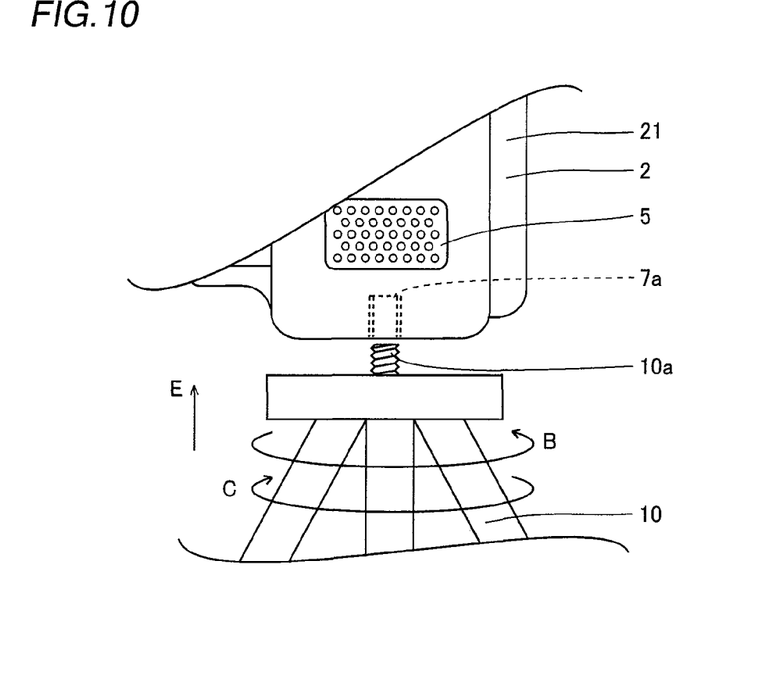
FIG. 10 is an enlarged view of the video camera according to the embodiment shown in FIG. 1, not yet mounted with the tripod.
Figure 11:
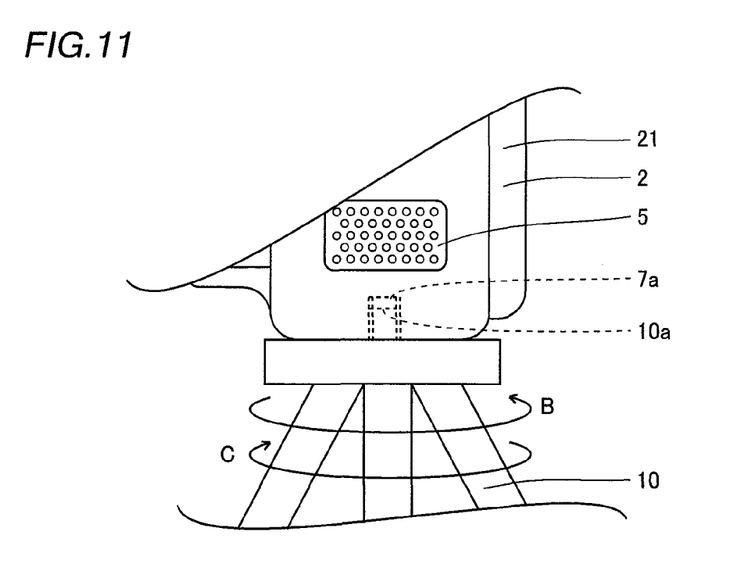
FIG. 11 is an enlarged view of the video camera according to the embodiment shown in FIG. 1 in the state mounted with the tripod.

As shown in FIGS. 10 and 11, the tripod 10 for supporting the video camera 1 is provided with an external thread 10a corresponding to the internal thread 7a of the tripod mounting member 7. In order to support the video camera 1 with the tripod 10, the external thread 10a of the tripod 10 is fitted into and clamped to the internal thread 7a of the mounting member 7. The external thread 10a is an example of the "first screw portion" in the present invention.

Operations for mounting and dismounting the tripod 10 on and from the video camera 1 are now described with reference to FIGS. 7, 10 and 11.

In order to mount the tripod 10 on the video camera 1, the tripod 10 is moved along arrow E for bringing the external thread 10a of the tripod 10 into contact with the internal thread 7a of the tripod mounting member 7, and the external thread 10a is thereafter rotated along arrow B, as shown in FIG. 10. If the external thread 10a of the tripod 10 is clamped with force less than the first force at this time, the plate spring member 9 is not elastically deformed to disengage the protrusion 9a of the plate spring member 9 and the corresponding engaging portion 7b of the tripod mounting member 7 from each other also when the first engaging surface 71b of this engaging portion 7c presses the inclined surface 91a of the plate spring member 9. When the external thread 10a of the tripod 10 is clamped with force less than the first force, therefore, the corresponding first engaging surface 71b of the tripod mounting member 7 and the first inclined surface 91a of the plate spring member 9 are kept in engagement with each other. Thus, the tripod mounting member 7 is not rotated along arrow B with the tripod 10, and the external thread 10a is fitted into the internal thread 7a. When the external thread 10a of the tripod 10 is clamped to the internal thread 7a of the tripod mounting member 7 with force exceeding the first force, on the other hand, the first engaging surface 71b of the corresponding engaging portion 7b presses the first inclined surface 91a of the plate spring member 9, for elastically deforming the plate spring member 9 through the first inclined surface 91a (protrusion 9a) easily elastically deformable as described above for disengaging the protrusion 9a of the plate spring member 9 and the engaging portion 7b of the tripod mounting member 7 from each other. When the external thread 10a of the tripod 10 is clamped with force exceeding the first force, therefore, the corresponding first engaging surface 71b of the tripod mounting member 7 and the first inclined surface 91a of the plate spring member 9 are disengaged from each other. Thus, the tripod mounting member 7 is rotated along B with the tripod 10, not to clamp the external thread 10a of the tripod 10 to the internal thread 7a of the tripod mounting member 7.

In order to dismount the tripod 10 from the video camera 1, on the other hand, the external thread 10a is rotated along arrow C, as shown in FIG. 11. If the external thread 10a of the tripod 10 is loosened with force exceeding the first force at this time, the plate spring member 9 is not elastically deformed to disengage the protrusion 9a of the plate spring member 9 and the corresponding engaging portion 7b of the tripod mounting member 7 from each other, due to the second inclined surface 92a (protrusion 9a) hardly elastically deformable as described above. Also when the external thread 10a of the tripod 10 is loosened with force exceeding the first force, therefore, the corresponding second engaging surface 72b of the tripod mounting member 7 and the second inclined surface 92a of the plate spring member 9 are kept in engagement with each other. Thus, the tripod mounting member 7 is not rotated along arrow C with the tripod 10, whereby the external thread 10a of the tripod 10 is detached from the internal thread 7a of the tripod mounting member 7.

According to this embodiment, as hereinabove described, the housing 2 includes the tripod mounting member 7, having the internal thread 7a fitted with the external thread 10a of the tripod 10 supporting the video camera 1 and the engaging portions 7b, rotatably provided thereon and the plate member 9 having the protrusion 9a so that each engaging portion 7b of the tripod mounting member 7 presses the protrusion 9a of the plate spring member 9 for disengaging the protrusion 9a of the plate spring member 9 from the engaging portion 7b of the tripod mounting member 7 if force exceeding the first force is applied to the tripod mounting member 7 when the external thread 10a of the tripod 10 is screwed into the internal thread 7a of the tripod mounting member 7, whereby the protrusion 9a of the plate spring member 9 and the engaging portion 7b of the tripod mounting member 7 are disengaged from each other and the tripod mounting member 7 (internal thread 7a) is rotated along arrow B with the tripod 10 (external thread 10a) when the external thread 10a of the tripod 10 is clamped to the internal thread 7a of the tripod mounting member 7 with force exceeding the first force. Therefore, breakage of the tripod mounting member 7 (internal thread 7a) can be suppressed also when the tripod 10 (external thread 10a) is clamped with excessive force (force exceeding the first force) to be fitted with the tripod mounting member 7 (internal thread 7a) of the video camera 1. When the tripod 10 (external thread 10a) is clamped to the tripod mounting member 7 (internal thread 7a) with force less than the first force, the protrusion 9a of the plate spring member 9 and the corresponding engaging portion 7b of the tripod mounting member 7 are kept in engagement with each other, so that the tripod mounting member 7 (internal thread 7a) is not rotated along arrow B with the tripod 10 (external thread 10a). Thus, the external thread 10a of the tripod 10 can be clamped to the internal thread 7a of the tripod mounting member 7 with force less than the first force.

According to this embodiment, the holding member 8 having the hole 8a rotatably receiving the tripod mounting member 7 for rotatably holding the tripod mounting member 7 received in the hole 8a is so mounted on the housing 2 that the tripod mounting member 7 can be easily held with the holding member 8.

According to this embodiment, the holding member 8 includes the columnar portion 8b provided across the hole 8a of the holding member 8 while the tripod mounting member 7 includes the step 7c provided along the outer periphery of the lower surface of the tripod mounting member 7 so that the upper surface of the tripod mounting member 7 comes into contact with the columnar portion 8b of the holding member 8 whereby the tripod mounting member 7 can be prevented from falling out of the hole 8a of the holding member 8 toward the inner side of the housing 2 (along arrow A), while the step 7c of the tripod mounting member 7 comes into contact with the bottom surface of the housing 2 whereby the tripod mounting member 7 can be prevented from falling out of the hole 8a of the holding member 8 toward the outer side of the housing 2 (along arrow D). Consequently, the tripod mounting member 7 can be supported on the video camera 1 without falling out of the hole 8a of the holding member 8.

According to this embodiment, the protrusion 9a of the plate spring member 9 includes the first inclined surface 91a and the second inclined surface 92a inclined by the prescribed angle with respect to the first inclined surface 91a while each engaging portion 7b of the tripod mounting member 7 includes the first and second engaging surfaces 71b and 72b engaging with the first and second inclined surfaces 91a and 92a of the plate spring member 9 respectively and the first and second engaging surfaces 71b and 72b of the engaging portion 7b and the first and second inclined surfaces 91a and 92a of the plate spring member 9 are so formed that the second engaging surface 72a and the second inclined surface 92a are kept in engagement with each other also when force exceeding the first force is applied to the tripod mounting member 7 along arrow C oppositely to the direction B and the second engaging surface 72b of the tripod mounting member 7 presses the second inclined surface 92a of the plate spring member 9 so that the second inclined surface 92a of the plate spring member 9 and the corresponding second engaging surface 72b of the tripod mounting member 7 are kept in engagement with each other also when force (exceeding the first force) larger than the clamping force (less than the first force) in the direction B is applied along arrow C in order to dismount the tripod 10 (external thread 10a) from the tripod mounting member 7 (internal thread 7a) of the video camera 1 by rotating the tripod 10 (external thread 10a) along arrow C oppositely to the direction B, whereby the tripod mounting member 7 (internal thread 7a) is not rotated along arrow C with the tripod 10 (external thread 10a). Thus, the tripod 10 (external thread 10a) can be easily dismounted from the tripod mounting member 7 (internal thread 7a) of the video camera 1.

According to this embodiment, the first and second engaging surfaces 71b and 72b of the engaging portions 7b are so provided on the outer periphery of the rotatable tripod mounting member 7 as to form the gears of the ratchet mechanism for limiting the rotational direction of the tripod mounting member 7 to the direction B while the first and second inclined surfaces 91a and 92a of the plate spring member 9 are so formed as to constitute the pawl of the ratchet mechanism so that the rotational direction of the tripod mounting member 7 can be easily limited only to the direction B with the engaging portions 7b of the tripod mounting member 7 and the plate spring member 9 constituting the ratchet mechanism, whereby the tripod 10 (external thread 10a) can be easily dismounted from the tripod mounting member 7 (internal thread 7a) of the video camera 1.

According to this embodiment, the first and second inclined surfaces 91a and 92a of the plate spring member 9 are rendered surface-contactable with the firs and second engaging surfaces 71b and 72b of each engaging portion 7b, whereby the engaging portion 7b of the tripod mounting member 7 can be inhibited from backlash when engaging with the plate spring member 9.

According to this embodiment, the first and second inclined surfaces 91a and 92a of the plate spring member 9 are so rendered elastically deformable toward the radial outer side of each engaging portion 7b of the tripod mounting member 7 that the protrusion 9a of the plate spring member 9 restores the shape thereof toward the center of the corresponding engaging portion 7b of the tripod mounting member 7 (rotation center O of the tripod mounting member 7) after the same is outwardly elastically deformed, whereby the subsequent engaging portion 7 of the tripod mounting member 7 and the protrusion 9a of the plate spring member 9 can easily engage with each other.

According to this embodiment, the plate spring member 9 is screwed to the tripod mounting member 7 on both of the mounting portions 9b closer to the first and second inclined surfaces 91a and 92a respectively, whereby the plate spring member 9 can be inhibited from misregistration also when the first and second inclined surfaces 91a and 92a of the plate spring member 9 are repetitively elastically deformed.

According to this embodiment, the 12 engaging portions 7b are so formed at the regular interval along the rotational directions of the tripod mounting member 7 that each engaging portion 7b of the tripod mounting member 7 and the protrusion 9a of the plate spring member 9 can engage with each other on a rotated position also when the tripod mounting member 7 is rotated along arrow B.

Although the present invention has been described and illustrated in detail, it is clearly understood that the same is by way of illustration and example only and is not to be taken by way of limitation, the spirit and scope of the present invention being limited only by the terms of the appended claims.

For example, while the above embodiment is described with reference to the video camera employed as an exemplary image pickup device, the present invention is not restricted to this but is also applicable to an image pickup device other than the video camera, so far as the image pickup device has a tripod mounting member.

While the tripod is employed as an exemplary support leg in the aforementioned embodiment, the present invention is not restricted to this but is also applicable to a support leg other than the tripod so far as the same can be mounted on a tripod mounting member of a video camera.

While the housing of the video camera is mounted with the holding member rotatably holding the tripod mounting member in the aforementioned embodiment, the present invention is not restricted to this but a holding portion rotatably holding the tripod mounting member may alternatively be integrally provided on a prescribed portion of the housing.

While the tripod provided with the external thread is mounted on the video camera provided with the tripod mounting member having the internal thread in the aforementioned embodiment, the present invention is not restricted to this but is also applicable to a case of mounting a tripod having an internal thread on a video camera provided with a tripod mounting member having an external thread.

While the 12 engaging portions of the tripod mounting member are formed along the rotational directions of the tripod mounting member in the aforementioned embodiment, the present invention is not restricted to this but at least an engaging portion may be formed on the tripod mounting member.

Figure 12:
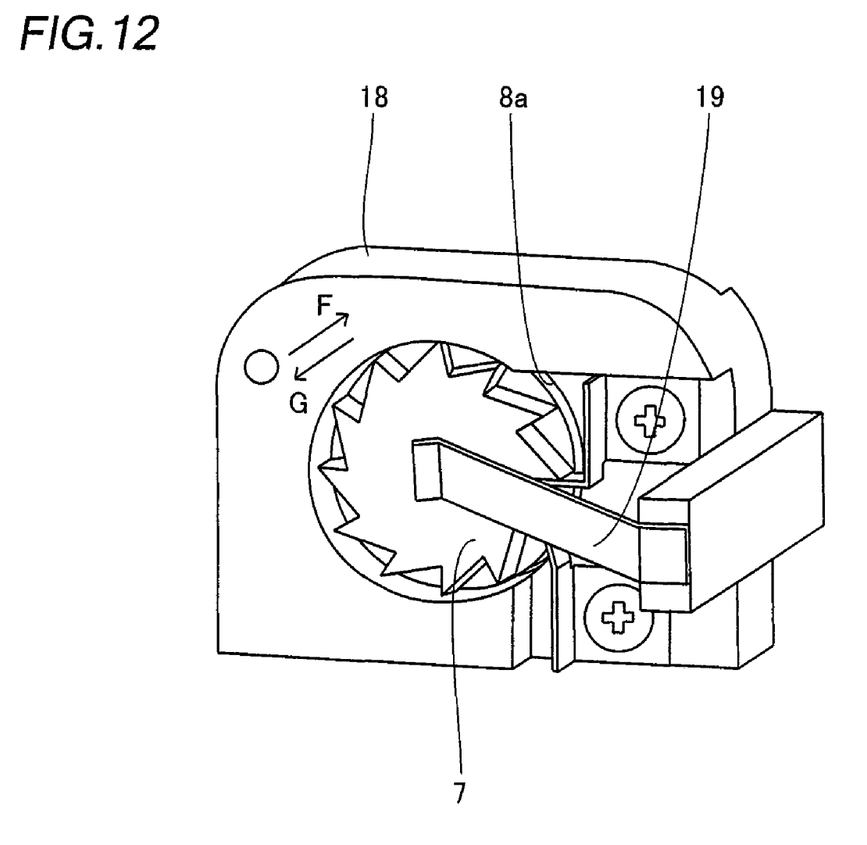
FIG. 12 is a perspective view showing a holding member according to a modification of the embodiment of the present invention, on which a tripod mounting member is arranged.

While the columnar portion 8b is formed across the hole 8a of the holding member 8 inside the housing 2 for preventing the tripod mounting member 7 received in the hole 8a of the holding member 8 from falling out of the hole 8a toward the inner side of the housing 2 in the aforementioned embodiment, the present invention is not restricted to this but a structure shown in FIG. 12 may alternatively be employed. More specifically, a holding member 18 shown in FIG. 12 includes a hole 18a and a presser bar spring 19 formed by a plate spring. The presser bar spring 19 presses a tripod mounting member 7 received in the hole 18a of the holding member 18 along arrow F with urging force, thereby inhibiting the tripod mounting member 7 from falling out of the hole 8a toward the inner side a housing (along arrow G). The presser bar spring 19 is an example of the "presser bar spring member" in the present invention.

While the holding member is screwed to the housing in the aforementioned embodiment, the present invention is not restricted to this but the holding member may alternatively be fixed to the housing by providing a notch on the holding member and providing a protrusion engaging with the notch of the holding member in the housing to face the bottom surface so that the notch of the holding member and the protrusion of the housing engage with each other and the holding member is held between the protrusion and the bottom surface of the housing.

What is claimed is:

1. An image pickup device comprising:
   a housing constituting the body of said image pickup device;
   a support leg mounting member, rotatably provided on said housing, having a second screw portion fitted with a first screw portion of a support leg supporting the body of said image pickup device and an engaging portion; and
   a plate spring member having a protrusion engaging with said engaging portion of said support leg mounting member;
   a holding member, mounted on said housing, having a hole rotatably receiving said support leg mounting member for rotatably holding said support leg mounting member received in said hole; and
   a prevention portion that prevents said support leg mounting member from falling out of said hole being provided on said holding member so as to protrude above said hole of said holding member, wherein
   said engaging portion of said support leg mounting member presses said protrusion of said plate spring member for disengaging said support leg mounting member and said protrusion of said plate spring member from each other if force exceeding first force is applied to said support leg mounting member in a first rotational direction when said first screw portion of said support leg is clamped to said second screw portion of said support leg mounting member in said first rotational direction,
   said support leg mounting member includes a step provided along the outer periphery of the lower surface of said support leg mounting member, and
   the upper surface and said step of said support leg mounting member come into contact with said prevention portion and the bottom surface of said housing respectively, so that said support leg mounting member is rotatably supported on said image pickup device.

2. The image pickup device according to claim 1, wherein said protrusion of said plate spring member includes a first inclined surface and a second inclined surface inclined by a prescribed angle with respect to said first inclined surface while said engaging portion of said support leg mounting member includes a first engaging surface engaging with said first inclined surface of said plate spring member and a second engaging surface engaging with said second inclined surface of said plate spring member, and
   said first and second engaging surfaces of said engaging portion and said first and second inclined surfaces of said plate spring member are so formed that said first engaging surface of said support leg mounting member presses said first inclined surface of said plate spring member to be disengaged from said first inclined surface when force exceeding said first force is applied to said support leg mounting member in said first rotational direction while said second engaging surface and said second inclined surface are not disengaged from each other even if said second engaging surface of said support leg mounting member presses said second inclined surface of said plate spring member when force exceeding said first force is applied to said support leg mounting member in a second rotational direction opposite to said first rotational direction.

3. The image pickup device according to claim 2, wherein said first and second engaging surfaces of said engaging portion are so provided on the outer periphery of rotatable said support leg mounting member as to form gears of a ratchet mechanism for limiting the rotational direction of said support leg mounting member to said first rotational direction, and said first and second inclined surfaces of said plate spring member are so provided as to form p awls of said ratchet mechanism.

4. The image pickup device according to claim 3, wherein said first and second inclined surfaces of said plate spring member are rendered surface-contactable with said first and second engaging surfaces of said engaging portion respectively.

5. The image pickup device according to claim 4, wherein at least said first inclined surface of said plate spring member is rendered elastically deformable toward the radial outer side of said engaging portion of said support leg mounting member.

6. The image pickup device according to claim 1, wherein said plate spring member is fixed to said support leg mounting member on both sides of first and second inclined surfaces.

7. The image pickup device according to claim 1, wherein a plurality of said engaging portions are formed on said support leg mounting member along the rotational direction of said support leg mounting member.

8. The image pickup device according to claim 1, further comprising a presser bar spring member pressing the upper surface of said engaging portion of said support leg mounting member.

9. An image pickup device comprising:
a housing constituting the body of said image pickup device;
a support leg mounting member, rotatably provided on said housing, having a second screw portion fitted with a first screw portion of a support leg supporting the body of said image pickup device and an engaging portion;
a holding member, mounted on said housing, having a hole rotatably receiving said support leg mounting member for rotatably holding said support leg mounting member received in said hole;
a prevention portion that prevents said support leg mounting member from falling out of said hole being provided on said holding member so as to protrude above said hole of said holding member,
a plate spring member, mounted on said holding member, having a protrusion including a first inclined surface and a second inclined surface inclined by a prescribed angle with respect to said first inclined surface, wherein
a plurality of said engaging portions each including a first engaging surface engaging with said first inclined surface of said plate spring member and a second engaging surface engaging with said second inclined surface of said plate spring member are formed on said support leg mounting member along the rotational direction of said support leg mounting member, said first and second engaging surfaces of each said engaging portion and said first and second inclined surfaces of said plate spring member are so formed that said first engaging surface of said support leg mounting member presses said first inclined surface of said plate spring member to be disengaged from said first inclined surface if force exceeding said first force is applied to said support leg mounting member in a first rotational direction while said second engaging surface and said second inclined surface are not disengaged from each other even if said second engaging surface of said support leg mounting member presses said second inclined surface of said plate spring member if force exceeding said first force is applied to said support leg mounting member in a second rotational direction opposite to said first rotational direction when said first screw portion of said support leg is clamped to said second screw portion of said support leg mounting member in said first rotational directions said support leg mounting member includes a step provided along the outer periphery of the lower surface of said support leg mounting member, and the upper surface and said step of said support leg mounting member come into contact with said prevention portion and the bottom surface of said housing respectively, so that said support leg mounting member is rotatably supported on said image pickup device.

10. The image pickup device according to claim 9, wherein said first and second engaging surfaces of said engaging portions are so provided on the outer periphery of rotatable said support leg mounting member as to form gears of a ratchet mechanism for limiting the rotational direction of said support leg mounting member to said first rotational direction, and said first and second inclined surfaces of said plate spring member are so provided as to form p awls of said ratchet mechanism.

11. The image pickup device according to claim 10, wherein
said first and second inclined surfaces of said plate spring member are rendered surface-contactable with said first and second engaging surfaces of each said engaging portion respectively.

12. The image pickup device according to claim 11, wherein
at least said first inclined surface of said plate spring member is rendered elastically deformable toward the radial outer side of each said engaging portion of said support leg mounting member.

13. The image pickup device according to claim 9, wherein said plate spring member is fixed to said support leg mounting member on both sides of said first and second inclined surfaces.

14. The image pickup device according to claim 9, further comprising a presser bar spring member pressing the upper surface of each said engaging portion of said support leg mounting member.

* * * * *